US009077606B2

(12) United States Patent
Ishioka

(10) Patent No.: US 9,077,606 B2
(45) Date of Patent: Jul. 7, 2015

(54) DATA TRANSMISSION DEVICE, DATA RECEPTION DEVICE, AND DATA TRANSMISSION METHOD

(75) Inventor: Toshiyuki Ishioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 277 days.

(21) Appl. No.: 13/319,188

(22) PCT Filed: Jun. 10, 2010

(86) PCT No.: PCT/JP2010/003860
§ 371 (c)(1),
(2), (4) Date: Nov. 7, 2011

(87) PCT Pub. No.: WO2010/143429
PCT Pub. Date: Dec. 16, 2010

(65) Prior Publication Data
US 2012/0072799 A1    Mar. 22, 2012

(30) Foreign Application Priority Data

Jun. 11, 2009   (JP) .................................. 2009-140307

(51) Int. Cl.
*H04L 25/49* (2006.01)
*G09G 3/20* (2006.01)
(52) U.S. Cl.
CPC .............. *H04L 25/4915* (2013.01); *G09G 3/20* (2013.01); *G09G 2370/08* (2013.01)
(58) Field of Classification Search
CPC .. G09G 3/20; G09G 2370/08; H04L 25/4915; H04L 25/49
USPC ................................................ 714/774, 776
See application file for complete search history.

(56) References Cited

U.S. PATENT DOCUMENTS

| 6,369,825 B1 | 4/2002 | Nakano |
| 6,404,917 B1 * | 6/2002 | Kondo et al. ................. 382/166 |

(Continued)

FOREIGN PATENT DOCUMENTS

| EP | 467208 A1 * | 1/1992 | ............... H04N 5/44 |
| JP | 9-244589 | 9/1997 | |

(Continued)

OTHER PUBLICATIONS

Schlessman, J.; Cheng-Yao Chen; Wolf, W.; Ozer, B.; Fujino, K.; Itoh, K., "Hardware/Software Co-Design of an FPGA-based Embedded Tracking System," Computer Vision and Pattern Recognition Workshop, 2006. CVPRW '06. Conference on , vol., No., pp. 123,123, Jun. 17-22, 2006.*

(Continued)

*Primary Examiner* — Cynthia Britt
(74) *Attorney, Agent, or Firm* — Wenderoth, Lind & Ponack, L.L.P.

(57) ABSTRACT

A data transmission system reduces the number of data transitions on signal lines in data transmission via parallel buses, and realizes a lower power consumption and lower EMI noise. A data transmission device transmits transmission data converted into encoded data, using n-bit signal lines. The data transmission device includes an arithmetic operation unit that generates difference data that represents the difference between first data for m bits of the transmission data and second data for m bits of the previous transmission data; and an encoding unit that encodes the difference data and generates m-bit encoded data. The encoding unit performs encoding to associate the encoded data with the difference data in such a manner that the number of bit inversions with respect to the encoded data associated with difference data "0" becomes smaller as the absolute value of the difference data becomes smaller.

9 Claims, 6 Drawing Sheets

(56) References Cited

U.S. PATENT DOCUMENTS

| | | | |
|---|---|---|---|
| 8,260,992 B2 * | 9/2012 | Dearth et al. | 710/117 |
| 2006/0098731 A1 * | 5/2006 | Bae | 375/240.1 |
| 2006/0222241 A1 | 10/2006 | Sasaki | |
| 2008/0316234 A1 * | 12/2008 | Toriumi | 345/690 |
| 2010/0164845 A1 | 7/2010 | Takagi et al. | |

FOREIGN PATENT DOCUMENTS

| | | |
|---|---|---|
| JP | 2000-152129 | 5/2000 |
| JP | 2002-366107 | 12/2002 |
| JP | 2006-157443 | 6/2006 |
| JP | 2006-261835 | 9/2006 |
| JP | 2008-287154 | 11/2008 |

OTHER PUBLICATIONS

International Preliminary Report on Patentability issued Jan. 26, 2012 in International (PCT) Application No. PCT/JP2010/003860.

International Search Report issued Sep. 14, 2010 in International (PCT) Application No. PCT/JP2010/003860.

* cited by examiner

Fig.2

| + | 0 | 0 | 0 | 0 | 0 | 0 | 0 | 0 | 0 |
|---|---|---|---|---|---|---|---|---|---|
| + | 1 | 0 | 0 | 0 | 0 | 0 | 0 | 0 | 1 |
| + | 2 | 0 | 0 | 0 | 0 | 0 | 0 | 1 | 0 |
| + | 3 | 0 | 0 | 0 | 0 | 0 | 1 | 0 | 0 |
| + | 4 | 0 | 0 | 0 | 0 | 1 | 0 | 0 | 0 |
| + | 5 | 0 | 0 | 0 | 0 | 0 | 0 | 1 | 1 |
| + | 6 | 0 | 0 | 0 | 0 | 0 | 1 | 0 | 1 |
| + | 7 | 0 | 0 | 0 | 0 | 1 | 0 | 0 | 1 |
| + | 8 | 0 | 0 | 0 | 1 | 0 | 0 | 0 | 1 |
| + | 9 | 0 | 0 | 1 | 0 | 0 | 0 | 0 | 1 |
| + | 10 | 0 | 1 | 0 | 0 | 0 | 0 | 0 | 1 |
| + | 11 | 1 | 0 | 0 | 0 | 0 | 0 | 0 | 1 |
| + | 12 | 0 | 0 | 0 | 0 | 0 | 1 | 1 | 0 |
| + | 13 | 0 | 0 | 0 | 0 | 1 | 0 | 1 | 0 |
| + | 14 | 0 | 0 | 0 | 1 | 0 | 0 | 1 | 0 |
| + | 15 | 0 | 0 | 1 | 0 | 0 | 0 | 1 | 0 |
| + | 16 | 0 | 1 | 0 | 0 | 0 | 0 | 1 | 0 |
| + | 17 | 0 | 0 | 0 | 0 | 1 | 1 | 0 | 0 |
| + | 18 | 0 | 0 | 0 | 1 | 0 | 1 | 0 | 0 |
| + | 19 | 0 | 0 | 0 | 0 | 0 | 1 | 1 | 1 |
| + | 20 | 0 | 0 | 0 | 0 | 1 | 0 | 1 | 1 |
| + | 21 | 0 | 0 | 0 | 1 | 0 | 0 | 1 | 1 |

SKIP

| + | 82 | 0 | 0 | 0 | 1 | 1 | 1 | 1 | 1 |
|---|---|---|---|---|---|---|---|---|---|
| + | 83 | 0 | 0 | 1 | 0 | 1 | 1 | 1 | 1 |
| + | 84 | 0 | 1 | 0 | 0 | 1 | 1 | 1 | 1 |
| + | 85 | 1 | 0 | 0 | 0 | 1 | 1 | 1 | 1 |
| + | 86 | 0 | 0 | 1 | 1 | 0 | 1 | 1 | 1 |
| + | 87 | 0 | 1 | 0 | 1 | 0 | 1 | 1 | 1 |
| + | 88 | 1 | 0 | 0 | 1 | 0 | 1 | 1 | 1 |
| + | 89 | 0 | 1 | 1 | 0 | 0 | 1 | 1 | 1 |

SKIP

| − | 1 | 1 | 0 | 0 | 0 | 0 | 0 | 0 | 0 |
|---|---|---|---|---|---|---|---|---|---|
| − | 2 | 0 | 1 | 0 | 0 | 0 | 0 | 0 | 0 |
| − | 3 | 0 | 0 | 1 | 0 | 0 | 0 | 0 | 0 |
| − | 4 | 0 | 0 | 0 | 1 | 0 | 0 | 0 | 0 |
| − | 5 | 1 | 1 | 0 | 0 | 0 | 0 | 0 | 0 |
| − | 6 | 1 | 0 | 1 | 0 | 0 | 0 | 0 | 0 |
| − | 7 | 1 | 0 | 0 | 1 | 0 | 0 | 0 | 0 |
| − | 8 | 1 | 0 | 0 | 0 | 1 | 0 | 0 | 0 |
| − | 9 | 1 | 0 | 0 | 0 | 0 | 1 | 0 | 0 |
| − | 10 | 1 | 0 | 0 | 0 | 0 | 0 | 1 | 0 |
| − | 11 | 0 | 1 | 1 | 0 | 0 | 0 | 0 | 0 |
| − | 12 | 0 | 1 | 0 | 1 | 0 | 0 | 0 | 0 |
| − | 13 | 0 | 1 | 0 | 0 | 1 | 0 | 0 | 0 |
| − | 14 | 0 | 1 | 0 | 0 | 0 | 1 | 0 | 0 |
| − | 15 | 0 | 0 | 1 | 1 | 0 | 0 | 0 | 0 |
| − | 16 | 0 | 0 | 1 | 0 | 1 | 0 | 0 | 0 |
| − | 17 | 0 | 0 | 1 | 0 | 0 | 1 | 0 | 0 |
| − | 18 | 0 | 0 | 1 | 0 | 0 | 0 | 1 | 0 |
| − | 19 | 1 | 0 | 0 | 0 | 1 | 1 | 0 | 0 |
| − | 20 | 1 | 0 | 0 | 0 | 1 | 0 | 1 | 0 |
| − | 21 | 1 | 0 | 0 | 0 | 1 | 0 | 0 | 1 |

OMIT

Fig.3

| TRANSMISSION DATA | 20 | 21 | 109 | 109 | 110 | 110 | 109 | 109 |
|---|---|---|---|---|---|---|---|---|
| DELAYED DATA | 0 | 20 | 21 | 109 | 109 | 110 | 110 | 109 |
| DIFFERENCE DATA | 20 | 1 | 88 | 0 | 1 | 0 | −1 | 0 |
| ENCODED DATA | 0<br>0<br>0<br>1<br>0<br>0<br>1<br>1 | 0<br>0<br>0<br>0<br>0<br>0<br>0<br>1 | 1<br>0<br>0<br>1<br>0<br>1<br>1<br>1 | 0<br>0<br>0<br>0<br>0<br>0<br>0<br>0 | 0<br>0<br>0<br>0<br>0<br>0<br>0<br>1 | 0<br>0<br>0<br>0<br>0<br>0<br>0<br>0 | 1<br>0<br>0<br>0<br>0<br>0<br>0<br>0 | 0<br>0<br>0<br>0<br>0<br>0<br>0<br>0 |
| NUMBER OF BIT INVERSIONS | 2 | 4 | 5 | 1 | 1 | 1 | 1 | 1 |

Fig.5

| TRANSMISSION DATA | 20 | 21 | 109 | 109 | 110 | 110 | 109 | 109 |
|---|---|---|---|---|---|---|---|---|
| DELAYED DATA | 0 | 20 | 21 | 109 | 109 | 110 | 110 | 109 |
| DIFFERENCE DATA | 20 | 1 | 88 | 0 | 1 | 0 | −1 | 0 |
| ENCODED DATA | 0 0 0 1 0 0 1 1 | 0 0 0 0 0 0 0 1 | 1 0 0 1 0 1 1 1 | 0 0 0 0 0 0 0 0 | 0 0 0 0 0 0 0 1 | 0 0 0 0 0 0 0 0 | 1 0 0 0 0 0 0 0 | 0 0 0 0 0 0 0 0 |
| NUMBER OF BIT INVERSIONS | | 2 | 4 | 5 | 1 | 1 | 1 | 1 |
| ENCODED OPERATION DATA | 0 0 0 1 0 0 1 1 | 0 0 0 1 0 0 1 0 | 1 0 0 0 0 1 0 1 | 1 0 0 0 0 1 0 1 | 1 0 0 0 0 1 0 0 | 1 0 0 0 0 1 0 0 | 0 0 0 0 0 1 0 0 | 0 0 0 0 0 1 0 0 |
| NUMBER OF BIT INVERSIONS | | 1 | 5 | 0 | 1 | 0 | 1 | 0 |

DATA TRANSMISSION DEVICE, DATA RECEPTION DEVICE, AND DATA TRANSMISSION METHOD

CROSS-REFERENCE TO RELATED APPLICATION

This application claims benefit of priority to Japanese Patent Application No. 2009-140307, filed on Jun. 11, 2009, the contents of which are incorporated hereinto by reference.

TECHNICAL FIELD

The present invention relates to data transmission devices, data reception devices, and data transmission methods for performing data transmission through parallel buses.

BACKGROUND OF THE INVENTION

In recent years, the amount of data handled by mobile devices such as portable telephone devices has become enormous. Therefore, like large-sized apparatuses, mobile devices need to reduce power consumptions and EMI (Electro-Magnetic Interference) noise in data transfers between devices such as memory interfaces and liquid crystal display interfaces.

In view of this, there have been techniques for lowering power consumptions and EMI noise by reducing the number of data transitions (hereinafter also referred to as the "number of bit inversions") on the signal lines in buses of memory interfaces or liquid crystal display interfaces or the like (see Patent Literatures 1 through 4, for example). Patent Literatures 1 through 3 disclose techniques for reducing the number of data transitions in data transmission using parallel buses.

Specifically, Patent Literature 1 discloses a technique for reducing the number of data transitions by converting transmission data into gray codes, and Patent Literature 2 discloses a technique for reducing the number of data transitions by adding or subtracting +1 to or from transmission data. By the technique disclosed in Patent Literature 3, the number of data transitions is reduced by inverting bits in original data when more than a half of the data is to be changed.

Patent Literature 4 discloses a technique for reducing the number of data transitions in data transmission using a serial bus. According to Patent Literature 4, in a natural image or the like, the probabilities of occurrence of difference data with respect to neighboring pixels are biased (or high in the neighborhood of "0"), and by taking advantage of such characteristics of image data, codes having small numbers of transitions are allotted to numerical values each having a high probability of occurrence of difference data ("00000000" is allotted to "0", "00000001" is allotted to "+1", and "11111110" is allotted to "−1", for example). Encoding is performed in this manner, and the number of data transitions is reduced.

REFERENCES

Patent Literatures

Patent Literature 1: Japanese Laid-Open Patent Publication No. H09-244589
Patent Literature 2: Japanese Laid-Open Patent Publication No. 2000-152129
Patent Literature 3: Japanese Laid-Open Patent Publication No. 2002-366107
Patent Literature 4: Japanese Laid-Open Patent Publication No. 2006-157443

SUMMARY OF THE INVENTION

Each of the techniques disclosed in Patent Literatures 1 through 3 is for general data, and is not particularly effective for image data as target data. According to Patent Literature 3, 1 bit needs to be added to the bus width of a conventional data bus, to send a notification showing whether or not there has been a bit inversion.

The technique disclosed in Patent Literature 4 is effective for image data. However, Patent Literature 4 concerns a technique involving a serial bus, and, according to Patent Literature 4, the number of data transitions is reduced by performing encoding with the use of a conversion table that is formed in such a manner that the number of transitions in a single value to be transmitted (or the number of transitions in a bit string) becomes small with respect to difference data with a high probability of occurrence.

However, where such encoded data is transmitted through parallel buses, the number of bit transitions on respective signal lines does not necessarily become smaller even after the number of transitions in a bit string to be transmitted is made smaller.

For example, the difference data "0", "+1", and "−1" having high probabilities of occurrence are associated with the encoded data "00000000", "00000001", and "11111110", as described above. When those encoded data are transmitted through a serial bus, the number of bit transitions can be restricted to a small value. However, when the encoded data, for example, "00000001" and "11111110" are transmitted in this order through an 8-bit parallel bus, the number of data transitions reaches the maximum number, 8. As described above, even if the number of data transitions in a single value (or a bit string) to be transmitted is reduced as disclosed in Patent Literature 4, the number of data transitions on respective signal lines of parallel buses does not become smaller. That is, the conversion table suggested in Patent Literature 4 is effective with a serial bus, but is not effective for data transmission using parallel buses.

The present invention has been made to solve the above problems, and an object thereof is to provide a data transmission device that can reduce the number of data transitions by taking advantage of the characteristics of image data in data transmission through parallel buses.

A data transmission device according to the present invention is a data transmission device that transmits transmission data converted into encoded data, using n-bit (n being k×m, k and m being natural numbers each equal to or greater than 1) signal lines. The data transmission device includes: an arithmetic operation unit that generates difference data that represents the difference between first data for m bits of the transmission data and second data for m bits of previous transmission data; and an encoding unit that encodes the difference data and generates m-bit encoded data. The encoding unit performs encoding to associate the encoded data with the difference data in such a manner that the number of bit inversions with respect to the encoded data associated with the difference data "0" becomes smaller as the absolute value of the difference data becomes smaller.

The data transmission device according to the present invention generates encoded data by performing encoding in such a manner that an n-bit code is associated with the difference data between data for n bits of transmission data and previous data for n bits. The number of bit inversions in the n-bit codes with respect to the n-bit codes associated with the difference data "0" becomes smaller as the absolute value of the difference data becomes smaller. By transmitting the encoded data through the n-bit signal lines, the number of data transitions on respective signal lines between the data transmission device and the data reception device is reduced. In this manner, a lower power consumption and lower EMI can be realized.

As described below, the present invention has other embodiments. Therefore, the disclosure of the invention is intended to provide part of the present invention, and is not intended to limit the scope of the invention described and claimed herein.

BRIEF DESCRIPTION OF THE DRAWLNGS

FIG. 2 is an encoding table according to the first embodiment of the present invention.

FIG. 3 shows an example of encoding according to the first embodiment of the present invention.

FIG. 5 shows an example of encoding and arithmetic operations according to the second embodiment of the present invention.

DETAILED DESCRIPTION OF THE INVENTION

The following is a detailed description of the present invention. The embodiments described below are merely examples of the present invention, and various modifications may be made to those embodiments. Therefore, the specific structures and functions disclosed in the following do not limit the scope of the invention.

A data transmission device according to an embodiment of the present invention is a data transmission device that transmits transmission data converted into encoded data, using n-bit (n being k×m, k and m being natural numbers each equal to or greater than 1) signal lines. The data transmission device includes: an arithmetic operation unit that generates difference data that represents the difference between first data for m bits of the transmission data and second data for m bits of previous transmission data; and an encoding unit that encodes the difference data and generates m-bit encoded data. The encoding unit performs encoding to associate the encoded data with the difference data in such a manner that the number of bit inversions with respect to the encoded data associated with the difference data "0" becomes smaller as the absolute value of the difference data becomes smaller.

The following is a description of embodiments of the present invention, with reference to the accompanying drawings.

(First Embodiment)

Figure 1:
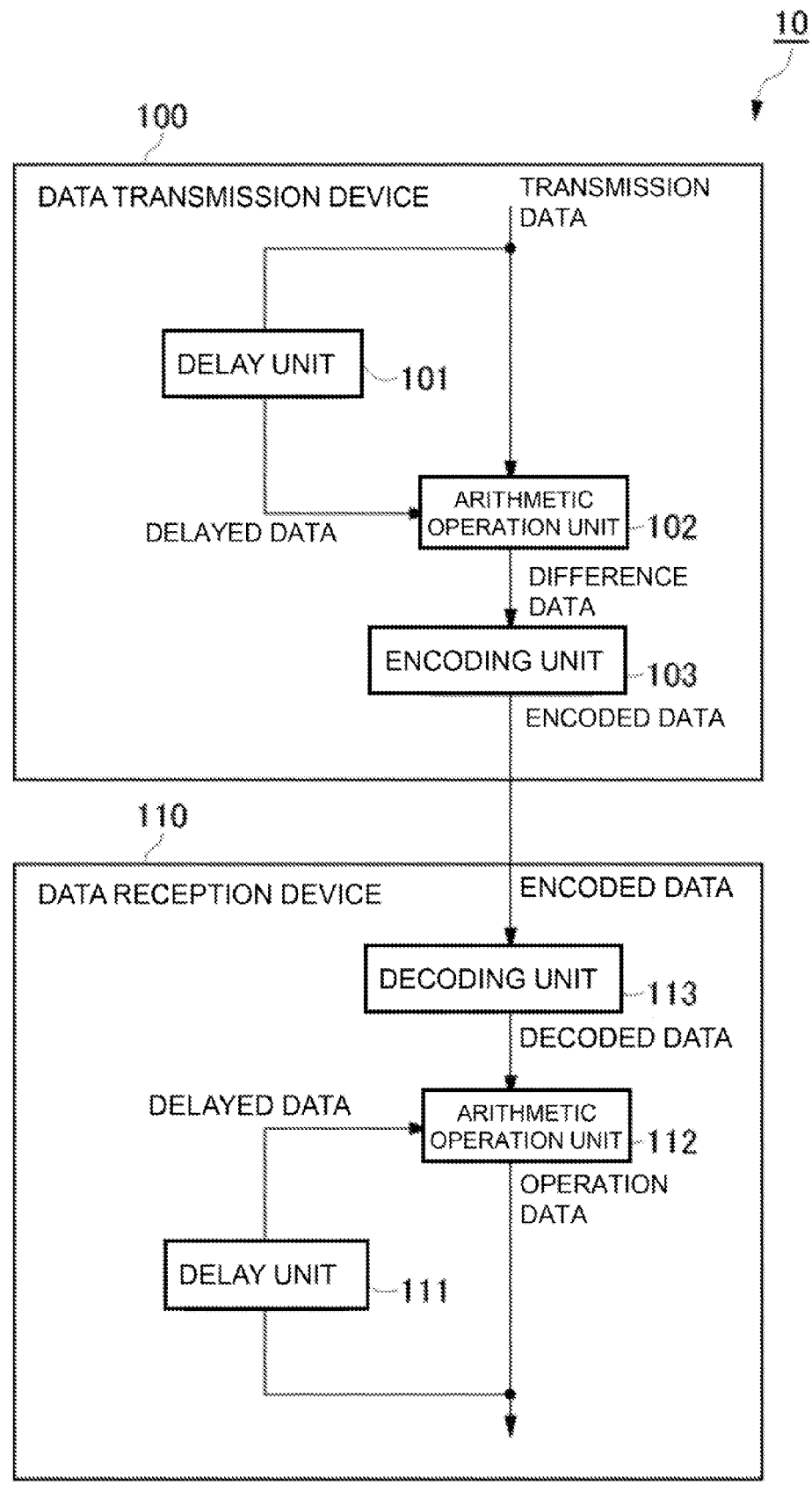
FIG. 1 is a block diagram of a data transmission system according to a first embodiment of the present invention.

FIG. 1 is a block diagram of a data transmission system according to a first embodiment of the present invention. The data transmission system 10 includes a data transmission device 100 that transmits data, and a data reception device 110 that receives data. In this embodiment, transmission data is image data in an RGB format, the data transmission device 100 is a system LSI, and the data reception device 110 is a display device. Those components form a display data transmission system.

In the data transmission system 10, 8-bit data about the respective elements of RGB (24 bits in total) is transmitted in parallel between the data transmission device 100 and the data reception device 110 through 24-bit signal lines.

The data transmission device 100 includes a delay unit 101, an arithmetic operation unit 102, and an encoding unit 103. Image data that is transmission data is input to the data transmission device 100 in pixel sequential order. One frame of image data is input, followed by the input of the next frame of image data.

The delay unit 101 delays transmission data that is input, and outputs the delayed transmission data to the arithmetic operation unit 102. Transmission data is input to the arithmetic operation unit 102, and the previous transmission data that is output from the delay unit 101 is also input to the arithmetic operation unit 102. The arithmetic operation unit 102 calculates the difference between the data about a pixel that is input directly to the arithmetic operation unit 102, and the data about the previous pixel that is output from the delay unit 101 (the pixel data before the data about the pixel that is input directly to the arithmetic operation unit 102). Based on the difference, the arithmetic operation unit 102 generates difference data, and outputs the difference data to the encoding unit 103.

The encoding unit 103 receives the difference data that is output from the arithmetic operation unit 102. The encoding unit 103 then encodes the difference data, and outputs the difference data as encoded data. Those operations are performed on the 8-bit data about the respective RGB elements. The 8-bit encoded data about the respective elements of RGB that is output from the encoding unit 103 is transmitted to the reception device 110 through the 8-bit signal lines (24 bits for all the elements of RGB).

FIG. 2 is an encoding table to be used when the encoding unit 103 performs encoding. In the encoding table shown in FIG. 2, "0" is associated with "00000000". Encoded data is allotted in such a manner that a value having a smaller absolute value has fewer bit inversions on the corresponding signal line with respect to "00000000" associated with "0".

Take "1" and "20" for example; only the last bit is the inverted bit between "00000000" associated with "0" and "00000001" associated with "1", which has the smaller absolute value, and the number of bit inversions is 1.

On the other hand, the inverted bits between "00000000" associated with "0" and "00001011" associated with "20" are the three bits: the fifth bit, the seventh bit, and the eighth bit. In this case, the number of bit inversions is 3. As described above, "1", which has the smaller absolute value, has a much smaller number of bit inversions with respect to "00000000" associated with "0" than "20", which has the larger absolute value.

In a natural image, there are high correlations between adjacent pixels, and the difference values between the neighboring pixels form a Laplace distribution. That is, the difference value between two neighboring pixels is highly likely to be "0", and the probability of occurrence of "0" rapidly becomes lower as the absolute value of the difference value becomes larger. Where transmission data having such characteristics is transmitted through parallel buses, the number of bit inversions on the respective signal lines of the parallel buses can be reduced by using the encoding table shown in FIG. 2. In this manner, the power consumption can be reduced, and the EMI can be lowered.

In parallel transmission of image data such as data about a natural image, the number of bit inversions can be reduced by using the encoding table of FIG. 2, according to the following principle.

Where continuous data having the characteristics of a Laplace distribution such as image data about a natural image is transmitted, the difference data at the present time (at time t) is of course highly likely to be a value with a small absolute value typically including "0", and the difference data at an earlier time (t−1) is also highly likely to be a value with a small absolute value typically including "0".

Therefore, in the transition from time (t−1) to time t, the probability of a transition from a value with a smaller absolute value to a value with a smaller absolute value is higher. Accordingly, in a transition from a value with a smaller absolute value to a value with a smaller absolute value, the number of times a bit is inverted on the respective buses in data transmission can be made smaller by performing encoding in such a manner that the number of bit inversions on each of the parallel buses becomes smaller.

In the encoding table of FIG. 2, the encoded data having "1" as the number of inversions of bits from "0" are associated with "−4" through "−1" and "+1" through "+4", which are the difference data with smaller absolute values. Here, the encoded data having "1" as the number of bit inversions are the encoded data containing only one "1" among the eight bits in a case where the encoded data associated with the difference data "0" is "00000000".

The encoded data having "2" as the number of bit inversions are associated with "−18" through "−5" and "+5" through "+18", which are difference data with smaller absolute values except for "−4" through "+4". Here, the encoded data having "2" as the number of bit inversions are the encoded data containing two is among the eight bits in a case where the encoded data associated with the difference data "0" is "00000000".

Which one of the eights bits should be "1" is determined in such a manner that the number of transitions with respect to the encoded data associated with the difference data "+1" becomes smaller as the absolute value of difference data becomes smaller. Specifically, as for each set of the difference data "+5" through "+11", the last bit is "1", so that the number of inversions of bits from the difference data "+1" becomes 1. As for each set of the difference data "−5" through "−11", the first bit is "1", so that the number of inversions of bits from the difference data "−1" becomes 1.

Which one of the remaining seven bits of each set of the difference data "+5" through "+11" should be the other "1" is determined in such a manner that the number of transitions from the encoded data associated with the difference data "+2" (the difference data having the second smallest absolute value after the difference data "+1") becomes smaller as the absolute value of difference data becomes smaller. Specifically, as for each set of the difference data "+5" through "+11", the bit next to the last bit is "1" with the difference data "+5", so that the number of transitions of bits from the difference data "+2" becomes 1.

Thereafter, the encoded data having "3", "4", . . . as the numbers of inversions of bits from "0" are allotted in the same manner as above. In the encoding table, the encoded data having the smaller numbers of bit inversions with respect to the encoded data associated with the difference data "0" are associated, as a rule, with the difference data having the smaller absolute values, as described above. However, the above described effect can be achieved, even if this rule is not applied to all the difference data.

For example, even if the above rule is not applied to some difference data having relatively large absolute values, the effect to reduce the total number of bit inversions is not much affected, since the probability of occurrence of difference data with larger absolute values is low.

Referring back to FIG. 1, the data reception device 110 includes a decoding unit 113, an arithmetic operation unit 112, and a delay unit 111. The decoding unit 113 inputs and decodes encoded data transmitted from the data transmission device 100, to generate decoded data. In the decoding, the decoding unit 113 refers to the same table as the table used in the encoding by the encoding unit 103 of the data transmission device 100, or refers to the table shown in FIG. 2 as a decoding table.

Therefore, the decoded data is the difference data generated by the data transmission device 100. By referring to the decoding table having the same contents as those of the encoding table used in the encoding by the encoding unit 103, the decoding unit 113 decodes the encoded data having a smaller number of bit inversions with respect to the encoded data associated with the difference data "0", to form decoded data having a smaller absolute value.

The arithmetic operation unit 112 of the data reception device 110 generates and outputs operation data. The delay unit 111 delays the operation data that is output from the arithmetic operation unit 112, and outputs the delayed data to the arithmetic operation unit 112. The arithmetic operation unit 112 then adds the difference data obtained from the decoding unit 113 and the previous operation data that is output from the delay unit 111, to output current operation data. The operation data is the original transmission data that is restored.

FIG. 3 is a diagram showing an example of data encoding. FIG. 3 shows an example of data about a Y-coordinate line in a frame. In this example, the transmission data (pixel values) are "20", "21", "109", "109", "110", "110", "109", "109", . . . in sequential order from "0" in the X-coordinate.

In this case, the outputs of the delay unit 101 (with "0" being the initial value) are "0", "20", "21", "109", "109", "110", "110", "109", . . . . The arithmetic operation unit 102 calculates the respective differences to obtain difference data "20", "1", "88", "0", "1", "0", "−1", "0", . . . , and outputs the difference data to the encoding unit 103.

Based on the encoding table shown in FIG. 2, the encoding unit 103 encodes the difference data as follows: "20" into "00001011", "1" into "00000001", "88" into "10010111", "0" into "00000000", "1" into "00000001", "0" into "00000000", "−1" into "10000000", "0" into "00000000", . . . . The encoding unit 103 then transmits the encoded data to the data reception device 110.

Based on the decoding table having the same contents as those of the encoding table shown in FIG. 2, the data reception device 110 generates decoded data by decoding the received encoded data as follows: "00001011" into "20", "00000001" into "1", "10010111" into "88", "00000000" into "0", "00000001" into "1", "00000000" into "0", "10000000" into "−1", "00000000" into "0", . . . .

The arithmetic operation unit 112 adds the decoded data to the outputs of the delay unit 111 ("0" being the initial value), to generate operation data "20", "21", "109", "109", "110", "110", "109", "109", . . . as reception data The reception data are equal to the transmission data in the data transmission device 100.

In this example, the number of bit inversions from the transmission data "20" to "21" is 2, and the number of bit inversions from the transmission data "21" to "109" is 4. Thereafter, the respective numbers of bit inversions are 5, 1, 1, 1, 1, . . . . As can be seen from the above, in a case where the differences among neighboring data are small as in a natural image, the numbers of bit inversions can be restricted to small values as in the latter half of the example illustrated in FIG. 3.

In a natural image or the like, the difference data about a color difference (R-G, for example) tends to have a higher probability of occurrence of a value in the neighborhood of "0" than the difference data about G. Therefore, the number of bit inversions can be made smaller by using transmission data about the color differences (R-G and R-B) between R and the other two elements, than by using the data about each elements of RGB as transmission data.

(Second Embodiment)

Figure 4:
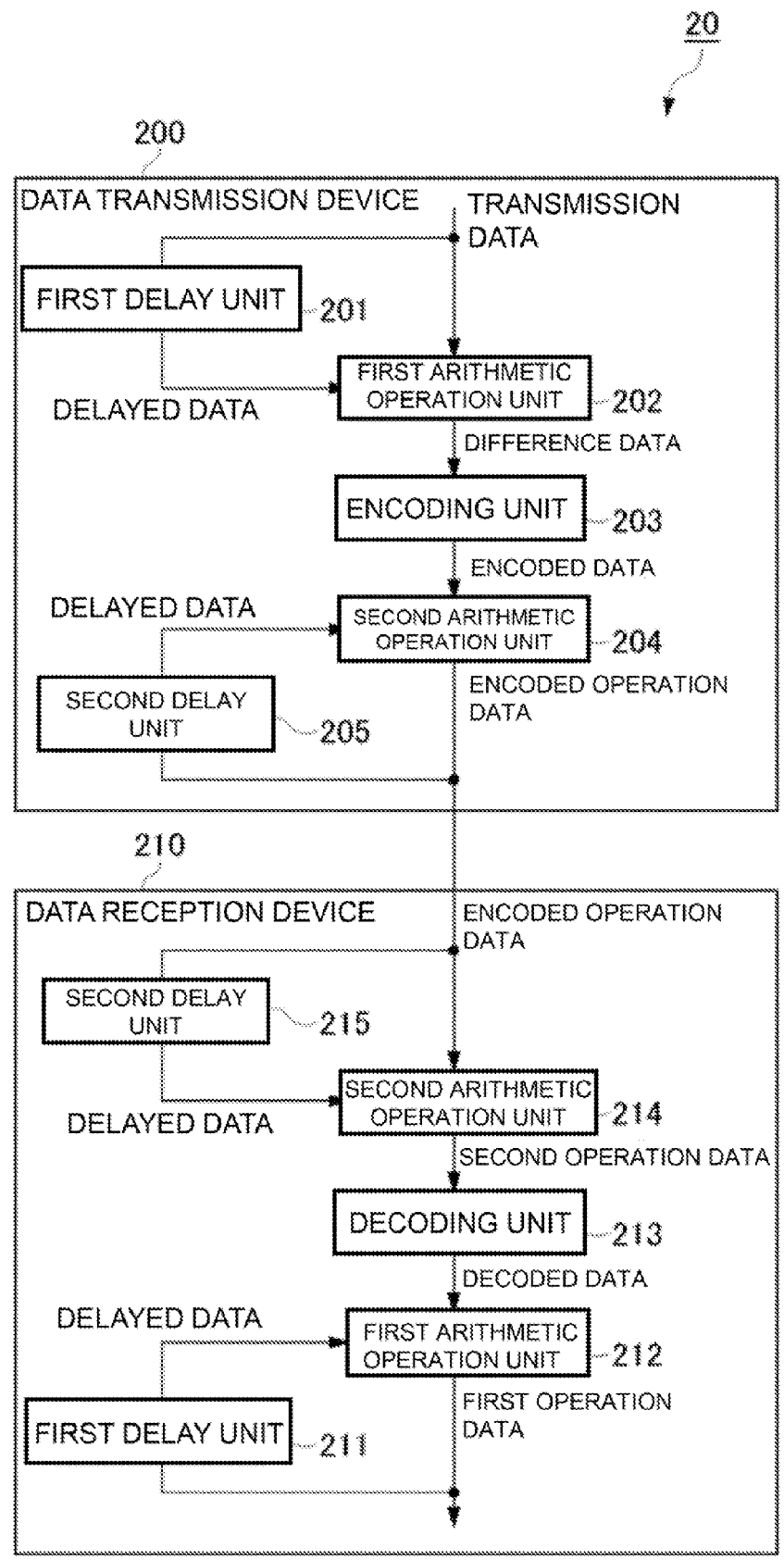
FIG. 4 is a block diagram of a data transmission system according to a second embodiment of the present invention.

FIG. 4 is a block diagram of a data transmission system according to a second embodiment of the present invention. The data transmission system 20 includes a data transmission device 200 that transmits data, and a data reception device 210 that receives data.

In this embodiment, the data transmission device 200 is a system LSI, and the data reception device 210 is a display device, as in the first embodiment. The data transmission system 20 is a display data transmission system formed by those devices, and transmission data is image data in an RGB format, as in the first embodiment.

In the data transmission system 20 of this embodiment, 8-bit data about each of the elements of RGB (24 bits in total) is transmitted in parallel between the data transmission device 200 and the data reception device 210 through 24-bit signal lines, as in the data transmission system 10 of the first embodiment.

The data transmission device 200 includes a first delay unit 201, a first arithmetic operation unit 202, an encoding unit 203, a second arithmetic operation unit 204, and a second delay unit 205. The data reception device 210 includes a second arithmetic operation unit 214, a second delay unit 215, a decoding unit 213, a first delay unit 211, and a first arithmetic operation unit 212.

In the data transmission system 20, the second arithmetic operation unit 204 and the second delay unit 205 are added to the components of the first embodiment at the output stage of the data transmission device 200, and the second arithmetic operation unit 214 and the second delay unit 215 are added to the components of the first embodiment at the input stage of the data reception device 210. With this structure, the data transmission system 20 can further reduce the number of bit inversions.

In the data transmission device 200, the operations of the first delay unit 201, the first arithmetic operation unit 202, and the encoding unit 203 are the same as those of the delay unit 101, the arithmetic operation unit 102, and the encoding unit 103 of the first embodiment, respectively. The second arithmetic operation unit 204 generates encoded operation data. The second delay unit 205 delays the encoded operation data generated by the second arithmetic operation unit 204, and outputs the delayed encoded operation data to the second arithmetic operation unit 204.

At the second arithmetic operation unit 204, the encoded data obtained from the encoding unit 203 is XORed with the previously encoded operation data that is output from the second delay unit 205, and is output as encoded operation data. It should be noted that the second delay unit 205 outputs "00000000" as the initial value.

The encoded operation data that is output from the second arithmetic operation unit 204 is sequentially transmitted to the data reception device 210 through 8-bit signal lines (24 bits in total for all the elements of RGB).

In the data reception device 210, the second delay unit 215 delays the encoded operation data transmitted from the data transmission device 200, and outputs the delayed encoded operation data to the second arithmetic operation unit 214. The encoded operation data is input from the second arithmetic operation unit 204 to the second arithmetic operation unit 214, and the previously encoded operation data that is output from the second delay unit 215 is also input to the second arithmetic operation unit 214. At the second arithmetic operation unit 214, the encoded operation data that is directly input is XORed with the previously encoded operation data that is output from the second delay unit 215, and is output as second operation data to the decoding unit 213.

In the data transmission system 20, the encoded data generated in the same manner as in the first embodiment is subjected to an operation at the second arithmetic operation unit 204, and is turned into encoded operation data in the data transmission device 200. The data transmission system 20 then transmits the encoded operation data to the data reception device 210.

In the data reception device 210, an operation is performed on the encoded operation data, to generate the second operation data. The second operation data is equal to the encoded data that is generated in the data transmission device 200. That is, the data reception device 210 restores the encoded data at the second arithmetic operation unit 214. The operations of the decoding unit 213, the first delay unit 211, and the first arithmetic operation unit 212 are the same as those of the decoding unit 113, the delay unit 111, and the arithmetic operation unit 112 of the first embodiment, respectively.

FIG. 5 is a diagram showing an example of data encoding and arithmetic operations in the second embodiment. In the example shown in FIG. 5, the same example data as that shown in FIG. 3 is used. Referring to FIG. 5, the operations of the second arithmetic operation unit 204 and the second delay unit 205 in the data transmission device 200 are described.

When the second arithmetic operation unit 204 receives the encoded data "00010011" as the first output from the encoding unit 203, the encoded data "00010011" is XORed with the initial value "00000000", which is output from the second delay unit 205, and "00010011" is output as encoded operation data. The second delay unit 205 delays the encoded operation data "00010011", and outputs the delayed data to the second arithmetic operation unit 204.

The second encoded data "00000001" is XORed with the previously encoded operation data "00010011" at the second arithmetic operation unit 204, and encoded operation data "00010010" is output from the second arithmetic operation unit 204. Thereafter, encoded data is XORed with previously encoded operation data in the same manner as above at the second arithmetic operation unit 204, and "10000101", "10000101", "10000100", "10000100", "00000100", "00000100", . . . are output as encoded operation data from the second arithmetic operation unit 204.

In the data reception device 210, the received encoded operation data "00010011", "00010010", "10000101", "10000101", "10000100", "10000100", "00000100", "00000100", . . . are XORed bitwise with the outputs of the second delay unit 215 (the initial value being "0": "00000000"), which are "00000000", "00010011", "00010010", "10000101", "10000101", "10000100", "10000100", "00000100", . . . at the second arithmetic operation unit 214. As a result, the second operation data "00010011", "00000001", "10010111", "00000000", "00000001", "00000000", "10000000", "00000000", . . . are output to the decoding unit 213.

As is apparent from FIG. 5, the second operation data is equal to the encoded data obtained from the encoding unit 203 of the data transmission device 200.

In the first embodiment, the numbers of bit inversions before and after the transmission of the difference data "88" are as large as 4 and 5, as shown in FIG. 3. In the second embodiment, on the other hand, the encoded data is not merely formed by encoding difference data, but is further XORed bitwise with the data transmitted at the previous time.

Therefore, in the second embodiment, the number of bit inversions prior to the transmission of the difference data "88" is as large as 5, but the number of bit inversions after the transmission of the difference data "88" is 0, as shown in FIG. 5. That is, in the second embodiment, the number of bit inversions occurring after the appearance of difference data having a large value can be dramatically reduced.

(Third Embodiment)

Figure 6:
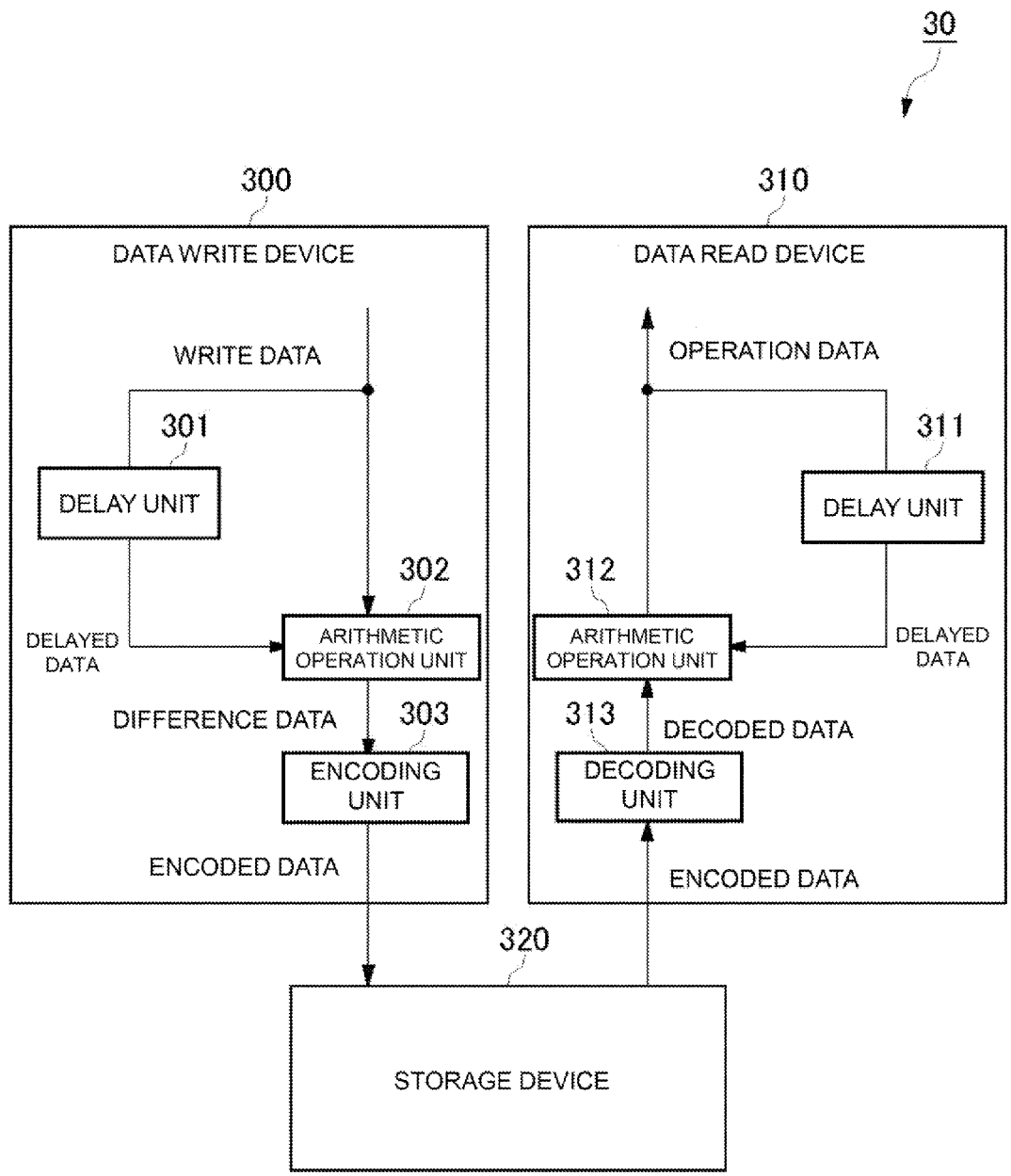
FIG. 6 is a block diagram of a data transmission system according to a third embodiment of the present invention.

FIG. 6 is a block diagram of a data transmission system according to a third embodiment. The data transmission system 30 is a system formed by connecting a data write device 300 and a data read device 310 that are system LSIs to a storage device 320 as a memory device by memory buses.

Write data and read data are image data in an RGB format. The data write device 300 includes a delay unit 301, an arithmetic operation unit 302, and an encoding unit 303. The data read device 310 includes a delay unit 311, an arithmetic operation unit 312, and a decoding unit 313.

The data write device 30C and the storage device 320 are connected by an 8-bit memory bus for the data about each of the elements of RGB (24 bits in total) and the storage device 320 and the data read device 310 are also connected by an 8-bit memory bus for the data about each of the elements of RGB (24 bits in total).

The operations of the delay unit 301, the arithmetic operation unit 302, and the encoding unit 303 of the data write device 300 are the same as those of the delay unit 101, the arithmetic operation unit 102, and the encoding unit 103 of the data transmission device 100 of the first embodiment, respectively.

The operations of the delay unit 311, the arithmetic operation unit 312, and the decoding unit 313 of the data read device 310 are the same as those of the delay unit 111, the arithmetic operation unit 112, and the decoding unit 113 of the data reception device 110 of the first embodiment, respectively.

In the data transmission system 10 of the first embodiment, the outputs of the encoding unit 103 of the data transmission device 100 are input (transmitted) directly to the decoding unit 113 of the data reception device 110.

In the data transmission system 30, on the other hand, the encoded data that is output from the encoding unit 303 of the data write device 300 is written into the storage device 320, and the decoding unit 313 of the data read device 310 reads the encoded data from the storage device 320.

The data encoding and decoding operations and the like are the same as those according to the first embodiment, and therefore, explanation of then is not repeated herein.

The data write device 300 may be designed to be the same as the data transmission device 200 of the second embodiment, and the data read device 310 may be designed to be the same as the data reception device 210 of the second embodiment. In that case, the number of bit inversions in data transmission for writing and reading can be further reduced as in the second embodiment.

(Modifications)

In the above described embodiments, an 8-bit data bus is used for each of the elements of RGB. However, the number of data bus bits is not limited to the above, and may be larger than or the smaller than the above, as long as 2 bits or more are allotted to each of the elements.

For example, a data transmission system may have data buses of 30 bits in total, having 10 bits allotted to each of the elements of RGB. Also, the data to be transmitted is not limited to RGB data, and may be Y, U, and V (brightness and color difference) data, for example. The present invention may be suitably applied to any data showing a Laplace distribution like image data, and may not be necessarily applied to image data.

Where RGB data is transmitted, the data about two elements (G and B, for example) may be transmitted as the color differences with R (R-G and R-B). Further, in the above description of the embodiments, the respective elements of RGB are regarded as independent of one another, and the same operation is performed on each one element (8 bits). However, the present invention is not limited to that.

In the above description of the embodiments, the encoded data associated with the difference data "0" is "00000000". However, the encoded data associated with the difference data "0" is not necessarily "00000000", and may be associated with any appropriate difference data.

Although preferred embodiments of the present invention that are conceivable at present have been described so far, various modifications may be made to those embodiments, and the appended claims are intended to contain all such modifications within the spirit and scope of the invention.

As described so far, a data transmission system according to the present invention has the effect to reduce the number of data transitions on n-bit signal lines between a data transmission device and a data reception device, and thereby reduce the power consumption and lower the EMI. Such a data transmission system is useful as a data transmission device that performs data transmission through parallel buses or the like.

DESCRIPTION OF REFERENCE NUMERALS 10 data transmission system
100 data transmission device
101 delay unit
102 arithmetic operation unit
103 encoding unit
110 data reception device
111 delay unit
112 arithmetic operation unit
113 decoding unit
20 data transmission system
200 data transmission device
201 first delay unit
202 first arithmetic operation unit
203 encoding unit
204 second arithmetic operation unit
205 second delay unit
210 data reception device
211 first delay unit
212 first arithmetic operation unit
213 decoding unit
214 second arithmetic operation unit
215 second delay unit
30 data transmission system
300 data write device
301 delay unit
302 arithmetic operation unit
303 encoding unit
310 data read device
311 delay unit
312 arithmetic operation unit
313 decoding unit
320 storage device

The invention claimed is:

1. A data transmission device that transmits transmission data converted into encoded data, using n-bit (n being k×m, k and m being natural numbers each equal to or greater than 1) signal lines, the data transmission device comprising:
- an arithmetic operation unit that generates difference data that includes a positive value and a negative value and outputs sequentially the positive value and the negative value, the difference data representing a difference between first data for m bits of the transmission data and second data for m bits of a previous set of the transmission data; and
- an encoding unit that encodes the difference data and generates m-bit encoded data,
- the encoding unit performing encoding to associate the encoded data with the difference data in such a manner that a number of bit inversions with respect to encoded data associated with the difference data "0" becomes smaller as an absolute value of the difference data becomes smaller.

2. The data transmission device according to claim 1, wherein the transmission data is image data in an RGB format, and each element of RGB has m bits.

3. The data transmission device according to claim 1, wherein the transmission data is image data in an RGB format, and two of m-bit elements of RGB represent color differences.

4. The data transmission device according to claim 1, wherein the transmission data is image data in a YUV format, and each element of YUV has m bits.

5. A data transmission device that transmits transmission data converted into encoded operation data, using n-bit (n being k×m, k and m being natural numbers each equal to or greater than 1) signal lines, the data transmission device comprising:
- a first arithmetic operation unit that generates difference data that includes a positive value and a negative value and outputs sequentially the positive value and the negative value, the difference data representing a difference between first data for m bits of the transmission data and second data for m bits of a previous set of the transmission data;
- an encoding unit that encodes the difference data and generates m-bit encoded data; and
- a second arithmetic operation unit that generates m-bit encoded operation data by adding the m-bit encoded data generated by the encoding unit to a previous set of the m-bit encoded operation data generated by the second arithmetic operation unit,
- the encoding unit performing encoding to associate the encoded data with the difference data in such a manner that a number of bit inversions with respect to encoded data associated with the difference data "0" becomes smaller as an absolute value of the difference data becomes smaller.

6. The data transmission device according to claim 5, wherein the second arithmetic operation unit generates the encoded operation data by calculating bitwise an exclusive OR, using the m-bit encoded data generated by the encoding unit and the previous set of the encoded operation data generated by the second arithmetic operation unit.

7. A data transmission device that transmits transmission data converted into encoded data, using n-bit (n being k×m, k and m being natural numbers each equal to or greater than 1) signal lines, the data transmission device comprising:
- an arithmetic operation unit that generates difference data that includes a positive value and a negative value and outputs sequentially the positive value and the negative value, the difference data representing a difference between data for m bits of the transmission data and second data for m bits of a previous set of the transmission data; and
- an encoding unit that encodes the difference data and generates the m-bit encoded data,
- wherein an absolute value of the difference data associated with encoded data having 1 as a number of bit inversions with respect to encoded data associated with the difference data "0" is smaller than an absolute value of the difference data associated with encoded data having 2 or greater as the number of bit inversions with respect to the encoded data associated with the difference data "0".

8. The data transmission device according to claim 7, wherein the absolute value of the difference data associated with the encoded data having 2 as the number of bit inversions with respect to the encoded data associated with the difference data "0" is smaller than an absolute value of the difference data associated with encoded data having 3 or greater as the number of bit inversions with respect to the encoded data associated with the difference data "0".

9. A data transmission method for transmitting transmission data converted into encoded data, using n-bit (n being k×m, k and m being natural numbers each equal to or greater than 1) signal lines, the data transmission method comprising:
- generating, using arithmetic operation unit difference data that includes a positive value and a negative value and outputs sequentially the positive value and the negative value, the difference data representing a difference between first data for m bits of the transmission data and second data for m bits of a previous set of the transmission data; and
- encoding, using an encoding unit, the difference data to generate the m-bit encoded data,
- the encoding the difference data including performing encoding to associate the encoded data with the difference data in such a manner that a number of bit inversions with respect to encoded data associated with the difference data "0" becomes smaller as an absolute value of the difference data becomes smaller, which reduces power consumption and electro-magnetic interference when transmitting the transmission data using the n-bit signal lines.

* * * * *